March 14, 1961  C. B. DALE  2,974,962
AUTOMATIC INDEXING RECORD CHANGER
Filed July 29, 1954  5 Sheets-Sheet 1

INVENTOR
COLIN B. DALE
BY
ATTORNEY

March 14, 1961 C. B. DALE 2,974,962
AUTOMATIC INDEXING RECORD CHANGER
Filed July 29, 1954 5 Sheets-Sheet 2

INVENTOR
COLIN B. DALE
BY
Paul Kolisch
ATTORNEY

March 14, 1961     C. B. DALE     2,974,962
AUTOMATIC INDEXING RECORD CHANGER
Filed July 29, 1954     5 Sheets-Sheet 3

INVENTOR
COLIN B. DALE
BY Paul Kolisch
ATTORNEY

March 14, 1961  C. B. DALE  2,974,962
AUTOMATIC INDEXING RECORD CHANGER
Filed July 29, 1954  5 Sheets-Sheet 4

INVENTOR
COLIN B. DALE
BY Paul Rolnick
ATTORNEY

March 14, 1961  C. B. DALE  2,974,962
AUTOMATIC INDEXING RECORD CHANGER
Filed July 29, 1954  5 Sheets-Sheet 5
FIG. 12.
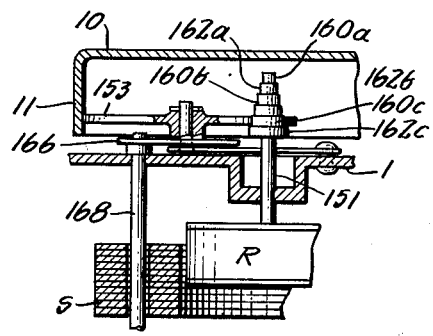
FIG. 14.
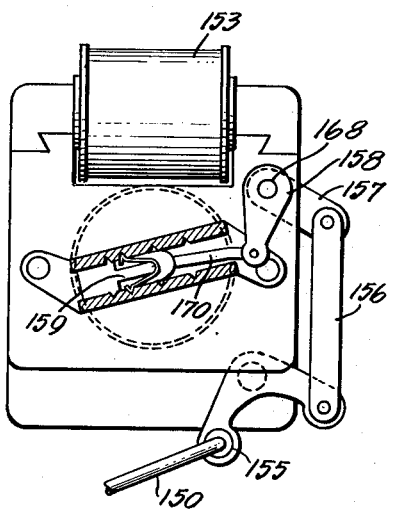
FIG. 13.
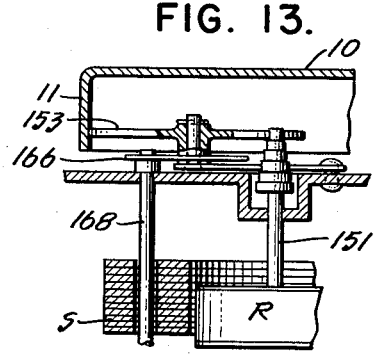
FIG. 16.  FIG. 17.  FIG. 18.
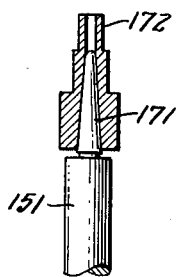 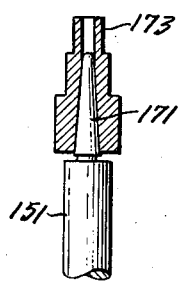 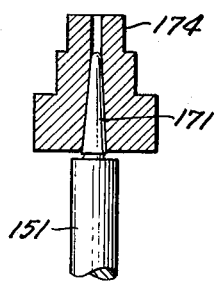
INVENTOR
COLIN B. DALE
BY
ATTORNEY

United States Patent Office 2,974,962
Patented Mar. 14, 1961

2,974,962

AUTOMATIC INDEXING RECORD CHANGER

Colin B. Dale, Oak Park, Ill., assignor to Webcor, Inc., a corporation of Illinois Filed July 29, 1954, Ser. No. 446,469

6 Claims. (Cl. 274—10)

This invention relates to sound record reproducing instrumentalities, and more particularly to improvements in automatic record changers of the multi-speed type adapted for reproducing record tablets of different diameters indiscriminately.

More specifically, the invention resides in an automatic record changer which is adapted to reproduce record tablets of three different diameters each of which requires a different turntable speed for its proper reproduction, and on which such different size record tablets may be reproduced automatically in sequence.

The principal object of the invention is to provide an automatic record changer of the character described wherein a manual control means is adapted for selectively pre-setting the speed change mechanism, and for initiating a cycle of automatic operation.

A further object of the invention is to provide an automatic record changer of the character described wherein a tone arm control mechanism is indexed in accordance with the diameter of a record tablet deposited on the turntable upon initiation of a cycle of operation.

Another object of the invention is to provide an automatic record changer of the character described which is of extremely simple, low cost construction, light in weight and highly efficient for the purpose designed.

With the above and other objects in view, the invention resides in the novel construction, combination, and arrangement of parts, the novel features of which are set forth with particularity in the appended claims. The invention, both as to its organization and method of operation, together with additional objects and advantages thereof, will be understood from the following description of a specific embodiment when taken in connection with the accompanying drawings, in which:

Figs. 10 through 13 are fragmentary, vertical cross sectional views illustrating the turntable drive mechanism including the motor shaft displacing mechanism adjusted for operation at 78 and 33⅓ r.p.m., at 50 c.p.s., and at 78 and 33⅓ r.p.m., at 60 c.p.s. respectively;

Fig. 14 is a bottom plan view of the motor per se showing the sliding step-cam mechanism for adjusting the motor shaft axially relative to an idler wheel for driving the turntable, simultaneously with the selective setting of the speed change mechanism upon manual manipulation of a uni-control knob.

Figs. 16, 17 and 18 are fragmentary elevational views partly in section and illustrating a modified form of motor shaft detachably mounting a separate stepped pulley thereon.

Figure 1:
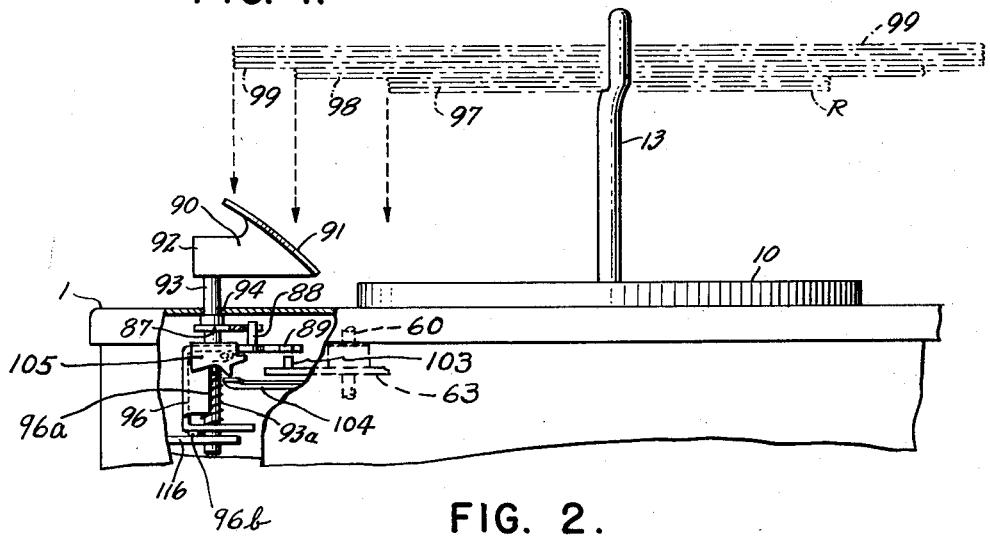
Fig. 1 is a fragmentary side elevation, partly in section, of the improved record changer illustrating a portion of the tone arm indexing mechanism.
Figure 2:
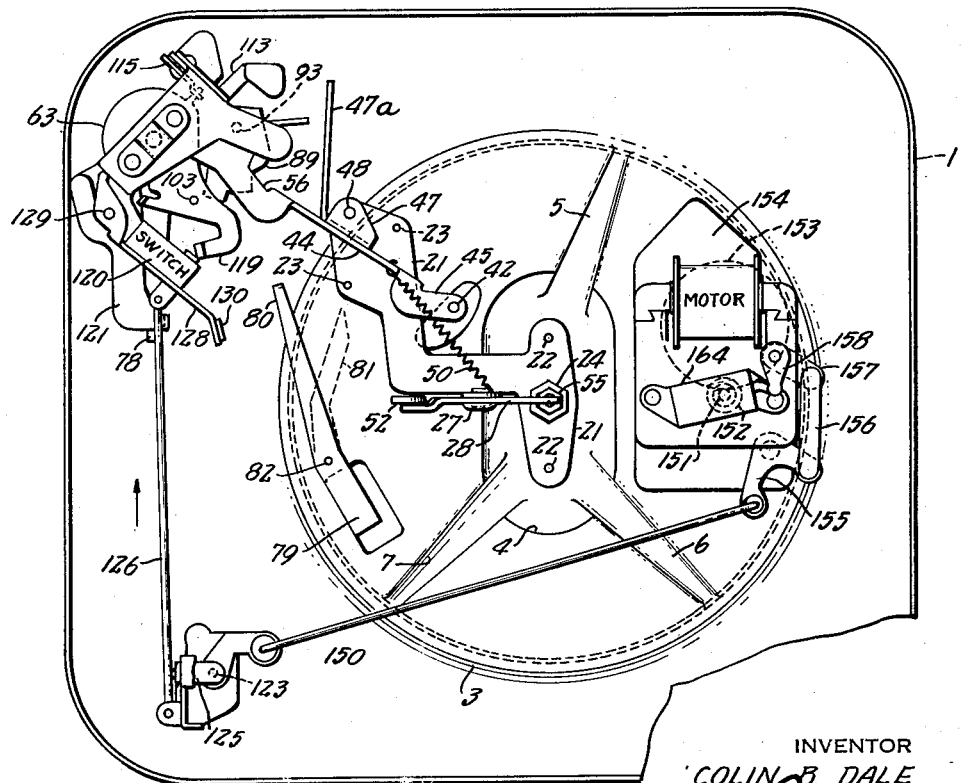
Fig. 2 is a bottom plan view of the improved record changer showing the automatic mechanism and motor to turntable drive including the manually actuated linkage for setting the speed change mechanism.

Referring to the drawings and to Figs. 1 and 2 in particular, a motor board 1 of thin sheet metal stiffened by a marginal flange 2, is provided with a central well 3 having an oblong depression 4 centrally thereof and connected with the margins of the well 3, by a plurality of radially extending channel corrugations 5, 6 and 7, the motor board 1 being provided centrally of its depressed portion 4 with an aperture therethrough.

An upstanding bearing sleeve 14 provided with a shoulder 15 and its bottom end suitably screw threaded, extends partly through the central aperture provided therefor in the motor board 1, with its shoulder 15 seated on the upper side thereof and secured thereto by means of the nut 24, an irregularly formed, offset reinforcing plate 21 being secured against the underside of the depressed portion 4 and well 3 formed in the motor board 1 by means of the rivets 22 and 23.

A turntable 10 having the customary depending peripheral flange 11 and a centrally apertured, depressed portion 12 is journaled on the bearing sleeve 14 substantially within the well 3 provided therefor in the motor board 1, by means of a bearing hub 17 having a shoulder 18 secured against the underside of the turntable 10, in axial registration with the central aperture in its depressed portion 12, by means of a dished washer 19 secured to the turntable 10 by the rivets 20, an anti-friction bearing 16 being disposed between the shoulder 15 on the bearing sleeve 14, and the bottom end face of the bearing hub 17.

Figure 15:
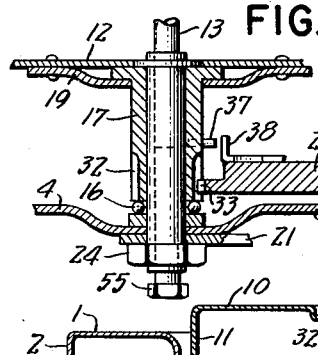
Fig. 15 is a fragmentary detail sectional view of the turntable and mounting mechanism therefor.

As clearly shown in Fig. 15, the bearing hub 17, is provided with gear teeth cut inwardly from its bottom end face to form a pinion 32 thereon, and also with a trip member in the form of a pin 37 or the like extending radially therefrom at a point above the pinion 32.

As also shown in Figs. 1 and 15, a known form of upstanding spindle 13 has its bottom end portion suitably secured in the upper end of the bore extending through the turntable bearing hub 17, for releasably supporting a stack of record tablets above the turntable 10 in known manner. A releasing mechanism within the spindle 13 is actuated through a plunger 55, disposed in the bottom end of the bore in the hub 17, the plunger 55 being actuated by one end of a rocker arm 28, pivoted intermediate its ends on a depending ear 26, formed on the reinforcing plate 21. The opposite end of the arm 28 has a roller 52 pivotally mounted thereon and extends part way through a suitable aperture in the reinforcing plate 21 and well 3 of motor board 1 for coactable engagement with a member now to be described.

Figure 6:
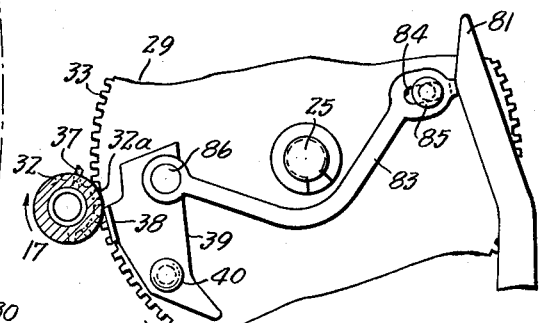
Fig. 6 is a detail plan view of a starting mechanism adapted for coupling the turntable pinion to the automatic mechanism.

An upstanding stub shaft 25 is suitably secured to the motor board 1 and reinforcing plate 21 with a cam gear 29 journaled thereon and held in place by a split washer 31, for meshing engagement with the pinion 32, on the bearing hub 17, by means of gear teeth 33 formed thereon. As best shown in Fig. 6, the gear teeth 33 are mutilated as at 32a whereby the cam gear 29 is periodically disconnected from the pinion 32 on the turntable hub 17 at a predetermined point where a spring influenced plunger 34, recessed in the bottom side face of the cam gear 29, coacts with a cupped projection 36, pressed upwardly out of the plane of the motor board 1, for yieldably locking the cam gear 29 in its normal inactive position.

Figure 7:
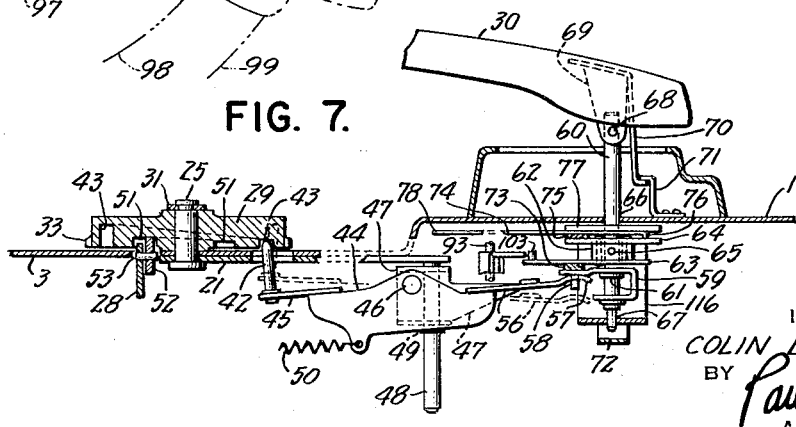
Fig. 7 is a fragmentary sectional view in elevation illustrating the mechanism under control of the tone arm for initiating a record changing operation after the tone arm has reached the terminal groove of a reproduced record.

As shown in Fig. 7, the cam gear 29 is provided in one side face thereof with a circular cam groove 51 having a spiral bottom surface, in which the roller 52, on the upper end of the rocker arm 28 rides for actuating the record releasing mechanism, and a non-circular cam groove 43 having an undulating bottom surface, in which the free end of an upstanding pin 42 on one end of a pivoted rocker arm 44 rides for actuating a tone arm control mechanism presently to be described.

Figure 4:
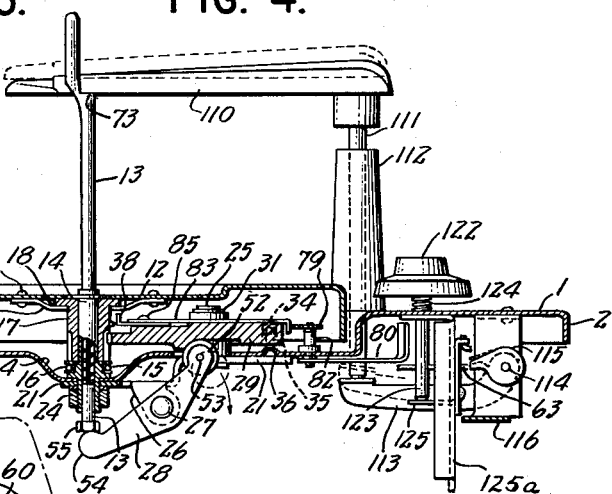
Fig. 4 is a fragmentary transverse sectional view of the improved record changer showing the record tablet supporting spindle and indicating a stack of different size records thereon, the indexing means actuated thereby and the releasing means therefor.
Figure 5:
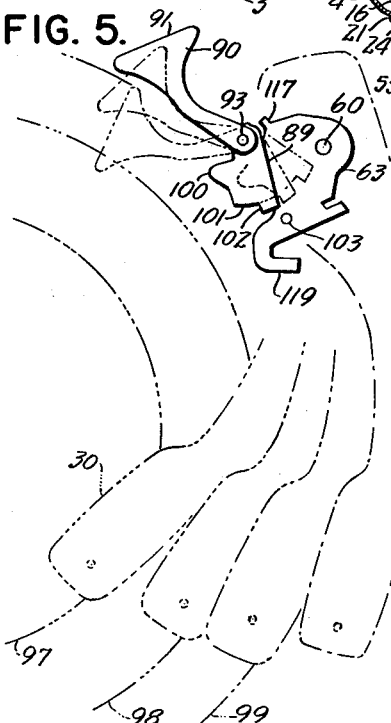
Fig. 5 is a schematic plan view illustrating the different positions in which the tone arm is set automatically by the indexing means.

As shown in Figs. 4 and 6, a plate member 39 having an upstanding lug 38 formed on one edge thereof, is pivotally mounted on the top side of the cam gear 29 by means of a pivot stud 40 with the lug 38 adjacent the periphery of the mutilated portion 32a of the gear teeth 33 formed thereon, an actuating link 83 being pivotally connected at one end to the plate member 39 by a pivot stud 86, and its opposite end provided with an elongated slot 84 and pivoted to the cam gear 29 by a pivot stud 85, whereby the link is movable endwise to position the lug 38 in the path of the pin 37, projecting from the turntable hub 17 for initially rotating cam gear 29 to bring its teeth 33 into mesh with the turntable pinion 32.

Ordinarily, during record reproduction, the turntable 10 rotates and pinion 32, on turntable hub 17 rotates in the mutilated portion 32a of the gear teeth 33. Thus, when lug 38 is moved into the path of pin 37 projecting from the turntable hub 17, the cam gear 29 will be initially rotated out of its inactive position by the yielding of its spring influenced plunger 34, and rotation thereof continued in the direction of the arrow 41, Fig. 6, for 360 degrees or until the mutilated tooth portion 32a returns opposite turntable pinion 32, whereupon the cam gear 29 is stopped and held in inactive position by the seating of the plunger 34 in the cupped projection 36 provided therefor on the motor board 1.

One revolution of cam gear 29 raises the tone arm 30, swings it out of reproducing position, releases the lowermost record tablet on the spindle 13 onto the turntable 10, swings the tone arm 30 inwardly to either 7, 10 or 12 inch record reproducing position and sets the tone arm 30 down on the record to be reproduced. The mechanism for performing these operations will now be described.

Figure 3:
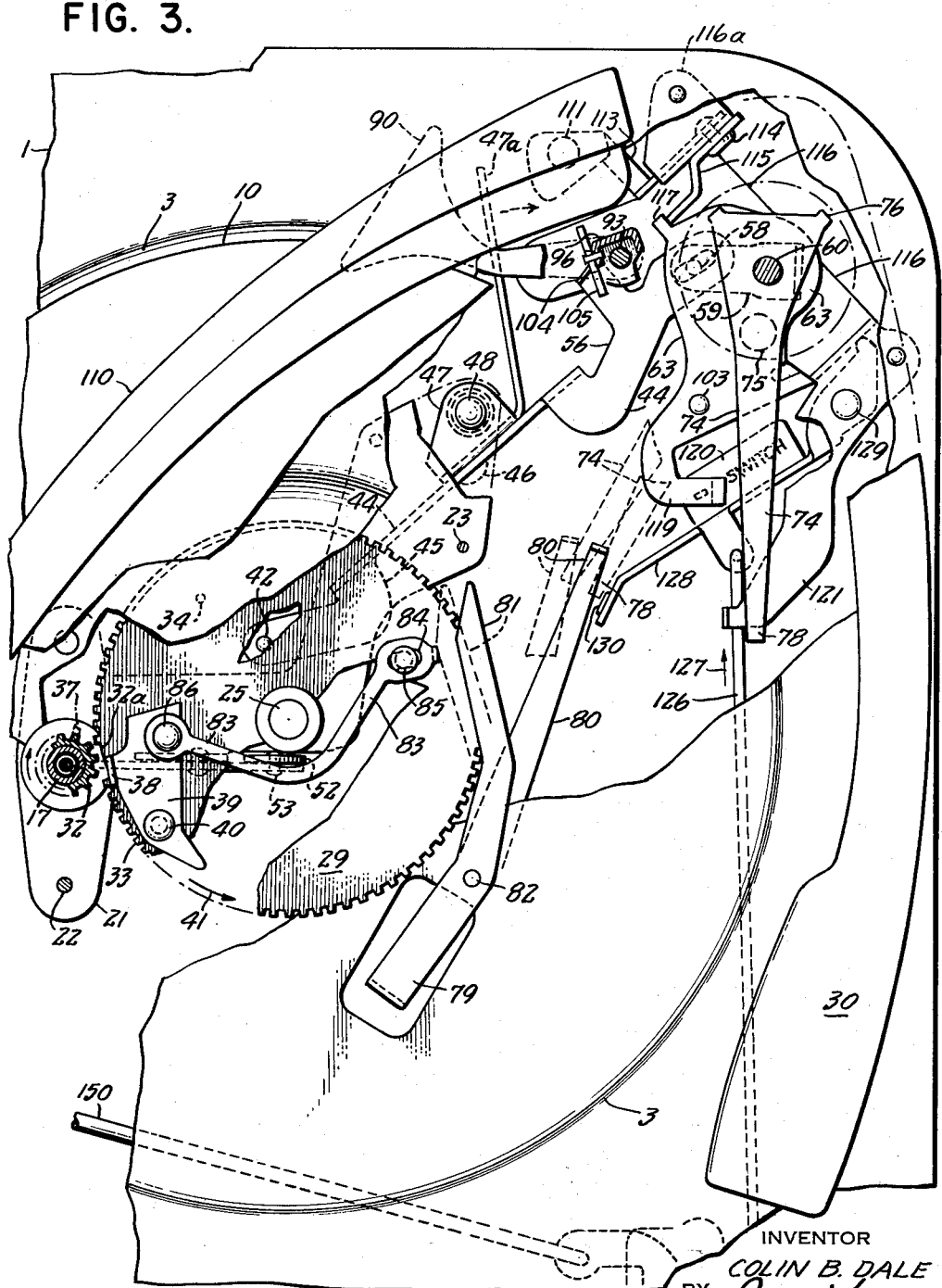
Fig. 3 is a fragmentary, enlarged top plan view of the improved record changer with the turntable removed, showing the tone arm control mechanism including the record actuated indexing means, speed change mechanism and cycle initiating mechanism.

The aforesaid rocker arm 44 mounting the upstanding pin 42 which is actuated by the non-circular groove 43 in the cam gear 29, is pivotally mounted, intermediate its ends, by a pivot pin 46 to a bracket 47 having a radially extending arm 47a integral therewith, journaled on a stub shaft 48 carried by and depending from an extended free end of the reinforcing plate 21, as clearly shown in Figs. 3 and 7, whereby the arm 47a on the aforesaid bracket 47, is moved into and out of the path of the extended free end of a pivoted lever 113, hereinafter described, and the opposite extended free end portion 57 of the rocker arm 44 is moved up and down in a vertical plane and laterally from side to side in response to rotation of the cam gear 29, the extended end portion 57 of the rocker arm 44 being curved and provided with an opening for receiving a pin 58 therein depending from a bracket member 59 forming a part of a tone arm mounting assembly hereinafter described.

The aforesaid rocker arm 44 also includes a relatively short branch arm 104 having its free end bent upwardly, the branch arm 104 being disposed in cooperative relation with a trigger mechanism, as in Fig. 6, for moving the indexing member or flag 90 inwardly toward the turntable and outwardly therefrom as hereinafter described.

As clearly shown in Fig. 7, the tone arm 30 is pivotally mounted on the upper end of an upstanding shaft 60 by means of a hinge pin 68 including a hinge bracket 69, the shaft 60 extending through an opening in the motor board 1, providing an upper bearing 66 therefor, and through an opening in the bottom side of a depending bracket 116, secured to the motor board 1, and providing a lower bearing 67 for the shaft 60, a strap 72 secured to the bracket 116 in spaced relation to the shaft bearing 67 providing a thrust bearing for the bottom end of the shaft 60. Downward movement of the tone arm 30 is limited to substantially the reproducing position thereof by means of a clip 70 depending from the hinge bracket 69 and presenting a bent free end for engagement with the bent free end of an upstanding complementary clip 71, suitably secured to the upper side of the motor board 1 as will be understood.

The tone arm supporting shaft 60 is further provided with a bracket 59 journaled thereon adjacent its bottom end and held against relative endwise movement thereon by a split spring washer 61, the upper laterally extending portion of the bracket 59 being provided with a depending pivot pin 58 which extends through the opening provided therefor in the curved end portion 57 of the arm 56 provided on the rocker arm 44, whereby axial movement of the shaft 60 to raise and lower the tone arm 30 occurs in response to actuating of the rocker arm 44 by the cam gear 29.

Angular movement of the aforesaid bracket 59 on the shaft 60 in response to actuation of the rocker arm 44 by the cam gear 29, is transmitted to the shaft 60 to swing the tone arm laterally by means of a disc 73 of cork or the like suitably secured on the top face of the bracket 59 for frictional engagement with the bottom side of a lever 63 having one end thereof staked to the lower end face of a collar 62 secured to the shaft 60 by a set screw 65, the opposite free end of the lever 63 being provided with an upstanding pin 103 for a purpose hereinafter described.

A relatively large washer 64 staked on the upper end face of the collar 62 and a velocity or feather arm 74 having one end thereof journaled on the shaft 60 in superposed relation with the washer 64 and presenting a pair of downwardly bent ears 76 and a friction disc 75 of cork or the like to the top face of the washer 64, is maintained in frictional contact with the washer 64, by a similar washer 77 superposed on the feather arm 74 whereby rotation of the aforesaid bracket 59 is also transmitted to the feather arm 74. However, since the curved end 57 of the extended arm 56 on the rocker arm 44 is in the dotted line position, when the tone arm 30 is in normal reproducing position, see Fig. 7, frictional engagement of the cork disc 73, secured on lever 63 with the bracket 59 and the cork disc 75 secured to the feather arm 74 with the washer 64 is such that no restriction is imposed on the free swinging movement of the tone arm assembly.

Thus, it will be seen that as the tone arm 30 advances toward the center of a record tablet during sound reproduction, the feather arm 74 will be frictionally carried with the tone arm shaft 60 through its cork disc 75 and operate the link 83 to move the lug 38 on the pivoted trip lever 39 into the path of the laterally extending pin 37 on the turntable hub 17. However, since the lug 38 is moved only to the extent occasioned by the small increment between the record grooves, the slanted end of the pin 37 will push the lug 38 and trip lever 39 back. When the trip lever is rocked to a greater extent as when the tone arm stylus reaches the course terminal groove on a record tablet, the lug 38 is moved directly into the path of the pin 37 whereby rotation of the cam gear 29 is initiated to bring its gear teeth 33 into mesh with the pinion 32 formed on the turntable hub 17.

As best shown in Fig. 3, the lever 63 which is secured to the tone arm shaft 60 for movement therewith, includes an upstanding pin 103, a laterally projecting lug 117 and a hooked free end portion 119 for purposes presently to be described.

An overarm 110 is secured to one end of a shaft 111, freely journaled in an upstanding pillar bearing 112 suitably secured on the motor board 1 with the lower free end of the shaft extending therethrough in spaced alignment with a pivotally mounted lever 113, presently to be described. The shaft 111 is suitably provided with a pin for coaction with a keyway extending through the bearing 112 whereby relative rotation of the shaft 111 and overarm 110 is normally prevented while permitting free axial movement thereof.

In order that one or more record tablets may be positioned on the spindle 13, it is necessary that the overarm 110 be adapted to be positioned to one side of the turntable 10. Accordingly, the uppermost end of the pillar bearing 112 is provided, in known manner, with a bayonet type recess whereby when the overarm is raised manually and moved to one side of the turntable 10, the pin on the shaft 111 will seat in the aforesaid recess and thus maintain the overarm 110 in fully raised position to one side of the turntable 10 as will be understood.

After a supply of record tablets have been placed on the spindle 13, the overarm 110 is placed on the uppermost record tablet whereby the shaft 111 will condition the mechanism for final tone arm control after the last record tablet has been released from the spindle 12. Accordingly, as successive record tablets are released onto the turntable 10, the overarm 110 is lowered in increments corresponding to the thickness of the released record tablet, whereby the shaft 111 is lowered step by step toward final actuating engagement with the aforesaid pivoted lever 113, the said lever being suitably biased upwardly, by means of a coil spring, whereby a stop link 115, suitably secured to the lever 113 for movement therewith, on one end 116a of the bracket 116, is maintained out of the path of the lug 117 on lever 63 to permit inward movement of the tone arm 30, in raised position, to the starting point for each successive record tablet.

During the release of each successive record tablet from the spindle 13, the radially extending arm 47a on the aforesaid bracket 47 moves under the extended free end of the pivoted lever 113, without exercising any control thereon since the lever 113 and stop link 115 are spring biased upwardly as aforesaid. However, after the last record tablet has been released from the spindle 13, the overarm 110 and its shaft 111 drop to their lowermost position in which the bottom end of the shaft 111 has depressed and so maintains the pivoted lever 113 and stop link 115 against the action of a biasing spring whereby the free end of the stop link 115 is maintained in the path of the lug 117 on the lever 63, carried by the tone arm shaft 60, and the tone arm 30 thus prevented from swinging inwardly from its raised outer position and subsequently lowered on a suitable rest member, usually provided therefor on the motor board 1, as the cam gear 29 completes its cycle.

During the lowering of the tone arm 30, after it has been moved to its "out" position, the shaft 60 and lever 63 are also lowered therewith whereby the hooked free end 119 of the lever 63, actuates a micro switch 120, secured intermediate the ends of a lever 128 having one end thereof pivoted as at 129, to the opposite end of the tone arm supporting bracket 116, as in Fig. 3, whereby current supply to the motor 153 is interrupted.

When a record tablet is placed on the turntable 10 by hand, and the tone arm 30 moved into reproducing position thereon, the lever 63 moves with the tone arm 30 whereby the hooked end 119 of the lever 63 is swung away from the microswitch 120 and the motor 153 energized. At the same time, the feather arm 74 is held against lateral movement by a bracket 121, comprising a lateral extension of the tone arm supporting bracket 116, having an upstanding ear 121a formed on its free end whereby the feather arm 74 is held against movement with the tone arm 30, the feather arm 74 being raised clear of the upstanding ear 121a only when the tone arm 30 is swung upwardly during the automatic cycle.

After a record tablet has been released onto the turntable 10, and sound reproduction initiated automatically, the record tablet may be rejected before the completion of its reproduction by depressing a uni-control knob 122 against a spring 124 whereby an upstanding shaft 123 mounting the knob and spring is moved downwardly against a bracket arm 125, pivotally mounted on the side of a depending bracket 125a, and having one end of a push rod 126 suitably linked thereto, and the opposite end of the rod 126 suitably linked to the switch carrying arm 128, Figs. 2 and 3 whereby movement of the rod 126 in the direction of the arrow 127 swings the arm 128 and the switch 120 out from under the free end 119 of the lever 63 whereby the motor is energized. At the same time, the arm 128 moves the leg 80 of the bifurcated lever 79 pivotally mounted on the motor board 1, whereby the leg 81 of the lever 79, trips the link 83 on the cam gear 29 whereby an automatic cycle is initiated.

When the uni-control knob 122 is released, the spring 124 operates to return its shaft 123, bracket arm 125, push rod 126 and switch arm 128 to normal position.

The uni-control knob 122 is also utilized in selecting a desired turntable speed, either 33⅓, 45 or 78 r.p.m., by rotating the knob 122 and its shaft 123, whereby a crank arm 149, rotatable with the shaft 123 and having one end of a push rod 150 linked thereto, and the opposite end of the rod 180 linked to mechanism for displacing a motor shaft 151 axially whereby one of a plurality of different driving diameters provided thereon may be brought into engagement with an idler wheel 153 directly, and the inner periphery of the turntable flange 11 indirectly as hereinafter described.

In accordance with the invention, the herein described mechanism functions to automatically set the tone arm 30 in initial record reproducing position regardless of whether a 7, 10 or 12 inch record on the spindle 13 has been released onto the turntable 10.

During sound reproduction or when the mechanism is out of cycle and at rest, the indexing member or flag 90 is in its extreme outer position, away from the periphery of the turntable 10, in which any, including 12 inch record tablets may be readily removed from the turntable 10 without obstruction by the indexing member 90. However, at the start of a cycle of automatic operation, the indexing flag 90 is moved inwardly to a position, corresponding to a 7 inch record tablet, where it may be engaged by either a 10 or 12 inch record tablet upon release onto the turntable 10.

Upon initiation of a cycle of automatic operation, the cam gear 29 imparts vertical and horizontal movement to the rocker arm 44, biased upwardly by a spring 50, by virtue of the pin 42 at one end thereof riding in the non-circular, undulating groove 43 in the said cam gear 29, whereby in the upward movement of the rocker arm 44, a branch arm 104, provided on the opposite end portion thereof, elevates a bearing bracket 96, rotatably mounted on the flag shaft 93, against a spring 93a, by lifting engagement with a pivoted latch or trigger 105, on one side of the bearing bracket 96, as shown in Fig. 1.

Upon subsequent lateral movement of the branch arm 104, the elevated bearing bracket 96 is rotated about the flag shaft 93 whereupon the latch or trigger 105 rides off the raised branch arm 104 and the spring 93a, restores the bracket 96 to its lowermost position. During the above angular movement of the bearing bracket 96, the flag shaft 93 is also rotated by means of a pivoted connection between a pin 88, carried by a shouldered cam plate 89, integral with the bracket 96, and a crank arm 87 secured to the flag shaft 93. In the above described angular movement of the flag shaft 93, the flag 90 is positioned for the smallest record size on the spindle 13.

In the final quarter of rotation of the cam gear 29, the rocker arm 44 is lowered to normal position and moved laterally in an opposite direction whereby its branch arm 104 engages the side margin 96a, of the bearing bracket 96 and thus swings it and the flag shaft 93 in the opposite direction. Thus, upon completion of a cycle of automatic operation or one revolution of the cam gear 29, the indexing flag 90 is restored to its outermost position away from the turntable 10 to be subsequently moved inwardly upon initiation of another cycle of automatic operation.

As shown in Fig. 1, a cork insert 96b, is suitably secured to the bottom face of the bearing bracket 96 for frictional engagement with an extended portion of the tone arm bracket 116 whereby to prevent free swinging angular movement of the bracket 96 when it is not being engaged by the branch arm 104 of the rocker arm 44.

Since the shouldered cam plate 89 moves with the bearing bracket 96, its stepped shoulder 100 is disposed in the path of a pin 103 on the lever 63, carried by the tone arm shaft 60, whereby inward movement of the tone arm 30 to a starting position for a seven inch record is controlled. From the foregoing it will be apparent that when the record tablet released onto the turntable 10 happens to be 7 inches in diameter, it will not, in its descent, engage the sloping face 91 of the indexing head or flag 90.

When a subsequently released record happens to be ten inches in diameter, it will, in its descent, engage the top face 91 of the indexing flag 90 and thus rotate its shaft 93 through a substantial angle whereby the cam plate 89 is also rotated to present its shoulder 101 in the path of the pin 103 on the lever 63 whereby the inward movement of the tone arm 30 is limited to the starting position for this size record tablet.

Similarly, when a 12 inch record is released onto the turntable 10, its engagement with the flag or indexing head 90 causes the cam plate 89 to be rotated with its stepped surface 102 in the path of pin 103 as aforesaid.

In either case, the timing of the mechanism is such that either size record tablet 97, 98 or 99 is released onto the turntable 10, after the tone arm 30, in raised position, has been moved to its extreme outer position. Subsequently, the tone arm 30 is moved inwardly until the pin 103 on the lever 63 which swings with the tone arm 30, engages either one of the stepped surfaces 100, 101 or 102 on the cam plate 89 as hereinbefore described, whereupon the tone arm shaft 60 and tone arm 30 are lowered to set a stylus in starting position on either of such record tablets, and free to traverse the same by reason of the fact that in the lowering of the tone arm 30, the lever 63 is also lowered whereby its pin 103 is disposed in a plane below the plane of the cam plate 89 of the aforesaid indexing mechanism.

It is to be noted that in the swinging movement of the tone arm 30 and its shaft 60, the rocker arm 44 is free to complete its full lateral movement in response to the cam gear 29 by reason of slippage between the lever 63 and the cork disc 73 secured on the bracket 59 journaled on the tone arm shaft 60.

The motor and its drive do not form part of the present invention and only its general features will be described. The motor assembly is mounted on an assembly plate 154 fastened to the underside of well 3. The rod 150 actuates by means of pivoted links 155, 156, 157, 158 a slidably mounted cam 159 for axially displacing the motor shaft with the rotor into any one of three positions. This will move the proper step into engagement with the idler 153 which is laterally displaced to clear the steps 152.

For the purpose of the present invention the upper end of the motor shaft projects above the mounting plate 1, within the space formed by the flange 11 of the turntable 10, into cooperative relation with the idler 153. The upper end of the motor shaft 151 has six stepped portions, each of a different diameter; the smallest diameter 160a adapted to drive the idler at 33⅓ r.p.m., at 60 c.p.s., the second portion 162a adapted to drive the idler at 33⅓ r.p.m., at 50 c.p.s., the third portion 160b adapted to drive the idler at 45 r.p.m., at 60 c.p.c., the fourth portion 162b adapted to drive the idler at 45 r.p.m, at 50 c.p.s., the fifth portion 160c adapted to drive the idler at 78 r.p.m., at 60 c.p.s., and the sixth portion 162c adapted to drive the idler at 78 r.p.m., at 50 c.p.s.

As shown in Figs. 10, 11, 12 and 13, the motor shaft 151 is shown in its several axially displaced positions for driving the turntable 10 indirectly through the idler 153 at one of the speeds aforesaid, the motor shaft being displaced axially by means of the stepped cam 159 slidably mounted on the motor in cooperable engagement with the lowermost end of the motor shaft.

Figure 8:
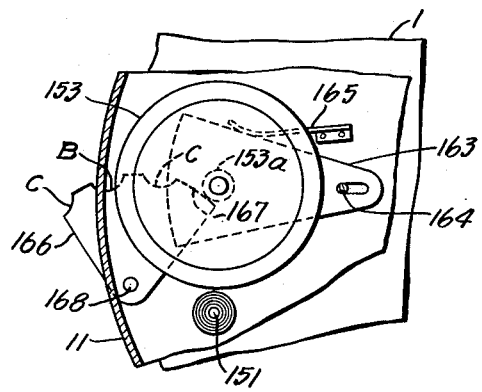
Fig. 8 is a fragmentary top plan view of the turntable drive mechanism illustrating the position thereof when the turntable is at rest.
Figure 9:
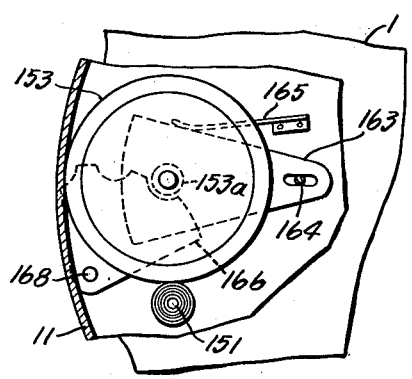
Fig. 9 is a similar view illustrating the position of the turntable drive mechanism when set for operation at 78 r.p.m.

The idler 153 is pivotally mounted on a triangular plate 163 pivoted on the mounting plate, as at 164, whereby the idler is adapted for radial and angular movement into and out of engagement shown in Fig. 8, the plate 163 being biased toward the motor shaft 151 by means of a suitable spring 165.

A cam plate 166 having an arcuate edge portion 167 provided with a plurality of spaced, semi-circular notches A, B and C, is also pivotally mounted on plate 1 adjacent the idler 153 and motor shaft 151 for engaging a collar 153a on the idler shaft whereby to shift the same to selected positions.

The stepped cam 159 for axially adjusting the motor shaft 151, and the cam plate 166 for adjusting the idler 153, are each connected to the control rod 150 through the links 155, 156, 157 and crank arm 158, including a shaft 168 and link 170 between the arm 158 and cam 159, for simultaneous control.

Accordingly, when the uni-control knob 122 is set in the "off" position, a high point of cam plate 166 engages collar 153a to hold idler 153 clear of the turntable rim 11 and the largest diameter of the upper end of the motor shaft 151 in which position the turntable 10 is at rest. Also in this position, the motor shaft 151 is in its highest position since the highest step of slide cam 159 has been moved under the lowermost end thereof.

Figure 10:
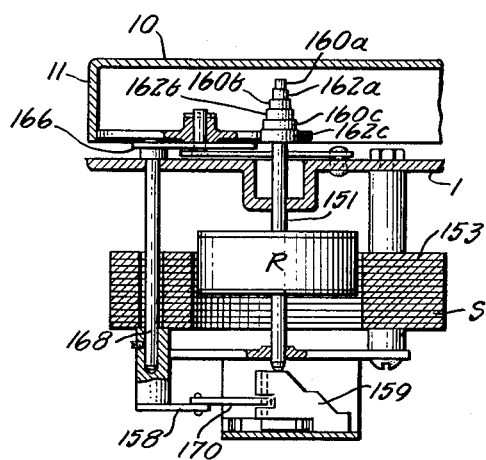
Figure 11:
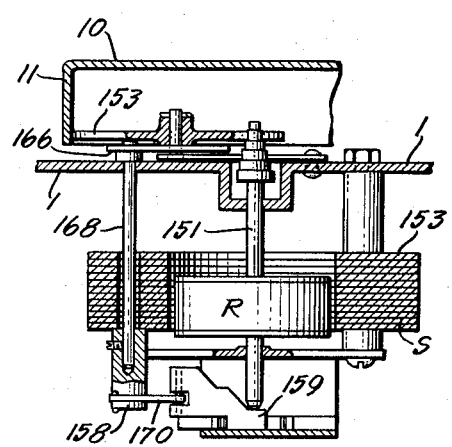

When 50 c.p.s. alternating current is available for operating the electric motor, the idler 153 is mounted with its extended hub portion uppermost as in Figs. 10 and 11. Thus, when the control knob 122 is set for 78 r.p.m., the idler 153 is free to move counterclockwise until collar 153a drops into dwell A in the cam plate 166. In this position the bottom end of the motor shaft 151 will rest on the highest step on the slide cam 159 and the idler 153 will be in engagement with the largest diameter of the motor shaft 151. It will be noted from Fig. 10 that in this position, the rotor R has been elevated slightly above the top side of the stator laminations S.

When the control knob 122 is set for 45 r.p.m., the cam plate 166 is moved clockwise and the idler collar 153 seated in the adjacent dwell B. Thus, while the high point between the dwells A and B moved past the idler collar 153a, the idler was moved away from the motor shaft 151 sufficiently to permit simultaneous axial adjustment of the motor shaft to a position wherein the idler 153 engages the third or intermediate diameter on the upper end of the movement of stepped cam 159 to a position in which its intermediate step supports the motor shaft.

When the control knob 122 is set for 33 r.p.m., the cam plate 166 is moved further clockwise to meet the idler collar 153a in dwell C of cam plate 166. During such movement, the idler 153 is moved away from the motor shaft 151 by the high point between the dwells A and B in the cam plate 166, to permit free axial adjustment of the motor shaft 151 downwardly simultaneously therewith. Thus, when the idler collar 153a is seated in the dwell C, in the cam plate 166, the idler 153 will be in engagement with another of the several diameters formed on the upper end of the motor shaft 151, and the bottom step on the slide cam 159 positioned under the bottom end of the motor shaft as shown in Fig. 11. It will be noted that in this position of the motor shaft 151, the rotor R is slightly below the bottom side of the stator laminations.

It will be clear from the foregoing, that the driving engagement between the upper end of the motor shaft 151 and the idler 153 may be selectively altered for any one of the three turntable speeds described. The fact that the idler 153 is moved radially away from the motor shaft 151 insures clearance for the six different driving diameters formed on its upper end, and the sloping surface between the steps formed on the slide cam 159, insures smooth axial adjustment of the motor shaft.

If the alternating current supply available is at 60 c.p.s., then the position of the idler 153 is inverted, as shown in Figs. 12 and 13, whereby in the selection of any one of the motor turntable speeds described, the axial adjustment of the motor shaft 151, as described, will align either the smallest diameter on the upper end of the motor shaft, the third diameter downwardly therefrom or the next to the largest diameter, with the idler 153, as clearly exemplified in Figs. 12 and 13, to drive the turntable 14 at 33⅓, 45 or 78 r.p.m. in accordance with the setting of the uni-control knob 122.

In order to obtain the utmost in concentricity for the motor shaft 151, the six different driving diameters on its upper end portion, are ground into and with the shaft instead of attaching a multi-stepped collar or several collars thereto.

Since all six diameters or steps are ground simultaneously with one tool set-up, it is just as economical as forming three diameters, and the concentricity of the various diameters can be held to very close tolerances. If a separate stepped drive pulley of the set-screw secured type were employed and its replacement in the field necessary, it is highly probable that the original high degree of concentricity would be lost. Consequently, by inverting the position of the idler 153, the benefits obtained by the original factory assembly, is not impaired.

If it is found that in the arrangement disclosed in Figs. 10 to 14, the six steps formed in the upper end of the shaft 151 place an undue strain on the motor and necessitate too great a depth for turntable 14, the arrangement of Figs. 16, 17 and 18 may be adopted. The upper end of the shaft 151 is tapered as indicated at 171. On the tapered end 171 is fitted a pulley 172, 173, 174, each having three steps of differing diameters, depending on whether 60 cycle, 50 cycle or 20 cycle drive is required. When it is required to change from one current supply system to another, the pulley is removed from the tapered shaft end 171 and replaced by another.

The invention may, of course, be utilized for other frequency conversions by using an additional spacer on the idler bearing shaft. By the use of spacers, the different positions (in height) of the idler wheel are possible. Thus, with nine different drive diameters on the motor shaft, a motor adapted for operation at three different frequencies, for example 20, 50 and 60 cycles may be employed.

It will be clear to those skilled in the art that while the invention has been described in the connection with a specific type of drive and sound responding device, many of its features are applicable to similar devices of widely differing points.

I claim:

1. In a record changer for playing automatically intermixed records of different sizes in successive playing cycles and having a turntable, means supporting a stack of records above the turntable for dropping them one at a time onto the turntable between playing cycles and a tone arm mounted at one side of the turntable, the combination of cycling means for moving the tone arm inwardly towards the center of the turntable at the start of a record playing cycle and outwardly from under said supported stack of records at the end of a record playing cycle including a freely movable driven member actuating said tone arm, a frictional slip clutch and a drive member movable to carry said tone arm through said frictional clutch and driven member to its initial playing position over the smallest size record at the start of a record playing cycle; indexing means for limiting movement of said driven member during inward movement of said driven member and the tone arm including a freely rotatable support, a flag member carried by said support and disposed above the level of said turntable, and an element shifted by said support for engaging said driven member selectively at predetermined spaced points corresponding to the different sizes of records being dropped to obstruct inward movement of said driven member accordingly; means actuated by said cycling means to move said rotatable support to and fro and thereby to move the flag member into the path of a falling record of predetermined size with the tone arm moved to an outward position and to move the flag to a normal resting position away from the center of the turntable during the record playing cycle, said flag member when disposed in the path of a falling record being contacted by the falling record and being freely movable thereby outwardly until the record is cleared to carry said indexing means element to a corresponding point of obstruction for said driven member.

2. In a record changer for playing automatically in successive playing cycles intermixed records of different sizes and having a turntable, means supporting a stack of records above the turntable for dropping them one at a time onto the turntable between playing cycles and a tone arm mounted at one side of the turntable, the combination of means for moving the tone arm inwardly towards the center of the turntable at the start of a record playing cycle and outwardly from under said supported stack of records at the end of a record playing cycle including a rocker arm, a freely movable driven member actuating said tone arm, a frictional slip clutch and a drive member actuated by the rocker arm for carrying said tone arm through said frictional clutch and driven member to its initial playing position over the smallest size record; indexing means for limiting movement of said driven member during inward movement of said driven member and the tone arm including a freely rotatable support, a flag member carried by said support in a resting position disposed at its outermost limit of movement and above the level of said turntable, and an element shifted by said support for engaging said driven member selectively at predetermined spaced points corresponding to the different sizes of records to obstruct inward movement of said driven member accordingly; an extension on said rocker arm for moving said rotatable support to and fro to move the flag member into the path of a falling record of predetermined size and move the flag to its resting position away from the center of the turntable, said flag member when disposed in the path of a falling record and being freely movable thereby outwardly until the record is cleared to carry said indexing means element to a corresponding point of obstruction for said driven member; and means for operating said rocker arm and record dropping means in timed relationship between playing cycles.

3. In a record changer for playing automatically intermixed records of different sizes and having a turntable, means supporting a stack of records above the turntable for dropping them one at a time onto the turntable between playing cycles and a tone arm mounted at one side of the turntable, the combination of means for moving the tone arm inwardly towards the center of the turntable to start a record playing cycle and outwardly from under said supported stack of records at the end of a record playing cycle including a freely movable driven member actuating said tone arm, a frictional slip clutch, and a drive member for carrying said tone arm through said frictional clutch and the driven member inwardly to its initial playing position over the smallest size; indexing means for limiting movement of said driven member during said inward movement of said drive member to stop inward movement of the tone arm including a freely rotatable support, a flag member carried by said support and disposed above the level of said turntable, and a stepped cam element shifted by said support for engagement by said driven member selectively at predetermined positions corresponding to the different sizes of records to obstruct inward movement of said driven member accordingly at a position corresponding to the size of the record dropped; means for moving said rotatable support to and fro to move the flag member into the path of a falling record of predetermined size and move the flag to a resting position away from the center of the turntable, said flag member when disposed in the path of a falling record being contacted by the falling record and being freely movable outwardly until the record is cleared to carry said indexing means element to a corresponding point of obstruction for said driven member and means for operating said record dropping means, said support moving means and said tone arm moving means in timed relation.

4. In an electrically powered record changer for playing automatically intermixed records of different sizes and having a turntable, means supporting a stack of records above the turntable for dropping them one at a time onto the turntable between playing cycles and a tone arm mounted at one side of the turntable, the combination of means for moving the tone arm inwardly towards the center of the turntable and outwardly from under said supported stack of records including a freely movable driven member actuating said tone arm, a frictional slip clutch and a drive member movable to carry said tone arm through said frictional clutch and driven member to its initial playing position over the smallest size record at the start of a record playing cycle; indexing means for controlling movement of said driven member during inward movement of said drive member and the tone arm including a freely rotatable support, a flag member carried by said support and disposed above the level of said turntable, and an element shifted by said support for engaging said driven member selectively at predetermined spaced points corresponding to the different sizes of records to obstruct inward movement of said driven member; means for moving said rotatable support to and fro to move the flag member over said turntable a distance limited to clearing the smallest record and move the flag to a resting position away from the center of the turntable, said flag member being passed by the smallest falling record to hold said indexing means element at a point of obstruction for said driven member corresponding to said smallest record; and record contacting means responsive to the drop onto the turntable of the last record of the stack for obstructing inward movement of said driven member and holding the tone arm in its outermost position; means for lowering said tone arm; and switch means for stopping the changer actuated by said tone arm and lowering means when the tone arm is lowered in its outermost position.

5. In an electrically powered record changer for playing automatically intermixed records of different sizes and having a turntable, means supporting a stack of records above the turntable for dropping them one at a time onto the turntable between playing cycles and a tone arm mounted at one side of the turntable, the combination of means for moving the tone arm inwardly towards the center of the turntable and outwardly from under said supported stack of records including a freely movable driven member actuating said tone arm, a frictional slip clutch and a drive member movable to carry said tone arm through said frictional clutch and driven member to its initial playing position over the smallest size record at the start of a record playing cycle; indexing means for controlling movement of said driven member during inward movement of said drive member and the tone arm including a freely rotatable support, a flag member carried by said support and disposed above the level of said turntable, and an element shifted by said support for engaging said driven member selectively at predetermined spaced points corresponding to the different sizes of records to obstruct inward movement of said driven member; means for moving said rotatable support to and fro to move the flag member over said turntable a distance limited to clearing the smallest record and move the flag to a resting position away from the center of the turntable, said flag member being passed by the smallest falling record to hold said indexing means element at a point of obstruction for said driven member corresponding to said smallest record; and means for locking the tone arm in rest position after playing the last record, including an over arm element fixed at one end to a vertically disposed shaft rising upwardly from the record changer, the lower end of said shaft cooperating with a pivotally mounted lever, said overarm element being adapted to rest on top of a stack of records follow the downward movement of the stack during each record play, and to drop further when the last record is dropped, the lower end of said shaft actuating said lever to obstruct inward movement of said driven member and hold the tone arm in its outermost position.

6. In a record changer for playing automatically intermixed records of different sizes in successive playing cycles and having a turntable, means supporting a stack of records above the turntable for dropping them one at a time onto the turntable between playing cycles and a tone arm mounted at one side of the turntable, the combination of cycling means for moving the tone arm inwardly towards the center of the turntable at the start of a record playing cycle and outwardly from under said supported stack of records at the end of a record playing cycle including a driven member moving said tone arm, to an initial playing position over the smallest size record at the start of a record playing cycle; indexing means for limiting movement of said driven member during movement of said driven member and the tone arm including a freely rotatable support, a flag member carried by said support and disposed above the level of said turntable, and an element shifted by said support for engaging said driven member selectively at predetermined spaced points corresponding to the different sizes of records being dropped to obstruct inward movement of said driven member accordingly, friction means for controlling shifting movement of said element; means actuated by said cycling means to move said rotatable support to and fro and thereby to move the flag member into the path of a falling record of predetermined size with the tone arm moved to an outward position and to move the flag to a normal resting position away from the center of the turntable during the record playing cycle, said flag member when disposed in the path of a falling record being contacted by the falling record and being freely movable thereby outwardly until the record is cleared to carry said indexing means element to a corresponding point of obstruction for said driven member.

References Cited in the file of this patent

UNITED STATES PATENTS

| | | |
|---|---|---|
| 2,237,340 | Downs | Apr. 8, 1941 |
| 2,488,260 | Ascoli | Nov. 15, 1949 |
| 2,509,811 | Dale | May 30, 1950 |
| 2,541,072 | Jones | Feb. 13, 1951 |
| 2,545,643 | Bender | Mar. 20, 1951 |
| 2,637,558 | Fisher | May 5, 1953 |
| 2,752,159 | Bacher | June 26, 1956 |

FOREIGN PATENTS

| | | |
|---|---|---|
| 477,325 | Great Britain | Dec. 24, 1937 |
| 114,287 | Sweden | June 19, 1945 |
| 664,630 | Great Britain | Jan. 9, 1952 |